(12) United States Patent
Ichihara

(10) Patent No.: US 9,132,700 B2
(45) Date of Patent: Sep. 15, 2015

(54) PNEUMATIC TIRE

(75) Inventor: Eiji Ichihara, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 211 days.

(21) Appl. No.: 13/639,771

(22) PCT Filed: Apr. 7, 2011

(86) PCT No.: PCT/JP2011/058823
§ 371 (c)(1),
(2), (4) Date: Nov. 8, 2012

(87) PCT Pub. No.: WO2011/126077
PCT Pub. Date: Oct. 13, 2011

(65) Prior Publication Data
US 2013/0048183 A1  Feb. 28, 2013

(30) Foreign Application Priority Data

Apr. 7, 2010  (JP) ................................. 2010-088618
Mar. 15, 2011  (JP) ................................. 2011-056699
Mar. 15, 2011  (JP) ................................. 2011-056700

(51) Int. Cl.
*B60C 3/00* (2006.01)
*B60C 3/04* (2006.01)
(Continued)

(52) U.S. Cl.
CPC ... *B60C 3/04* (2013.01); *B60C 3/00* (2013.01); *B60C 9/18* (2013.01); *B60C 9/28* (2013.01);
(Continued)

(58) Field of Classification Search
CPC .............. B60C 3/00; B60C 9/18; B60C 9/28; B60C 15/0009; B60C 15/0603; B60C 2015/009; B60C 2015/061; B60C 3/04; Y10T 152/10837
USPC .................................. 152/454, 538, 546, 541
See application file for complete search history.

(56) References Cited

U.S. PATENT DOCUMENTS 4,077,455 A * 3/1978 Curtiss et al. ................. 152/454
4,716,950 A * 1/1988 Morikawa et al.
(Continued)

FOREIGN PATENT DOCUMENTS

CN  1810529 A  8/2006
DE  36 04 528 A1  8/1986
(Continued)

OTHER PUBLICATIONS

English machine translation of DE 36 04 528, Aug. 14, 1986.*
(Continued)

*Primary Examiner* — Adrienne C Johnstone
(74) *Attorney, Agent, or Firm* — Sughrue Mion, PLLC

(57) ABSTRACT

In tread-width-direction cross section under a standard internal pressure and no load condition, a point B is an outermost point of overlapping area in tread-width-direction, a line CC is a line passing through an outermost point CT of carcass layer in tread-width-direction and extending along tread-width-direction, a point C is a point of tire surface through the line CC, a line segment BW is a line segment extending in tread-width-direction from an equator center line to point B, a line segment CW is a line segment extending along tread-width-direction from equator center line to point C, and a line segment BC is a line segment connecting between point B and C. A ratio BW/CW between a length of BW and CW is not less than 0.6 and not more than 0.8. An angle θ formed by BC and CW is not less than 50° and not more than 70°.

7 Claims, 6 Drawing Sheets

(51) Int. Cl.
*B60C 9/28* (2006.01)
*B60C 15/00* (2006.01)
*B60C 15/06* (2006.01)
*B60C 9/18* (2006.01)

(52) U.S. Cl.
CPC ......... *B60C 15/0009* (2013.04); *B60C 15/0603* (2013.04); *B60C 15/06* (2013.01); *B60C 2015/009* (2013.04); *B60C 2015/061* (2013.04); *Y10T 152/10765* (2015.01); *Y10T 152/10837* (2015.01)

(56) References Cited

U.S. PATENT DOCUMENTS

| | | | |
|---|---|---|---|
| 5,411,068 A | | 5/1995 | Kogure |
| 5,431,209 A | * | 7/1995 | Kajiwara et al. ............... 152/454 |
| 6,237,661 B1 | * | 5/2001 | Asano ........................ 152/454 X |
| 6,332,486 B1 | | 12/2001 | Ahn et al. |
| 6,367,526 B1 | * | 4/2002 | Hubbell, Jr. ............... 152/454 X |
| 6,491,076 B1 | * | 12/2002 | Colantonio et al. ........... 152/454 |
| 2009/0277552 A1 | | 11/2009 | Maruyama et al. |

FOREIGN PATENT DOCUMENTS

| | | | |
|---|---|---|---|
| DE | 198 30 145 A1 | | 1/1999 |
| EP | 0 238 679 A1 | | 9/1987 |
| JP | S58170602 A | | 10/1983 |
| JP | 7-186611 A | | 7/1995 |
| JP | 2000094906 A | | 4/2000 |
| JP | 2002200905 A | * | 7/2002 |
| JP | 2004306823 A | * | 11/2004 |
| JP | 2005271725 A | * | 10/2005 |
| JP | 2007008348 A | | 1/2007 |
| JP | 2007045361 A | * | 2/2007 |
| JP | 2008-105656 A | | 5/2008 |
| JP | 2008-201379 A | | 9/2008 |
| JP | 2009-137449 A | | 6/2009 |
| JP | 2009279948 A | | 12/2009 |
| JP | 2010/001006 | | 1/2010 |
| WO | 2010/122804 A1 | | 10/2010 |

OTHER PUBLICATIONS

International Search Report of PCT/JP2011/058823 dated Jul. 19, 2011.
Japanese Office Action issued May 27, 2014 in Japanese Patent Application No. 2012-509699.
Extended European Search Report issued in European Application No. 11765977.1 dated Mar. 17, 2014.
Chinese Office Action issued Aug. 26, 2014 in Chinese Patent Application No. 201180027972.4.
Communication dated Mar. 31, 2015 from the Japanese Patent Office in counterpart application No. 2012-509699.
Communication dated Feb. 25, 2015 from The State Intellectual Property Office of the P.R.C. in counterpart application No. 201180027972.4.

* cited by examiner

PNEUMATIC TIRE

TECHNICAL FIELD

The present invention relates to a pneumatic tire with a reduced rolling resistance.

BACKGROUND ART

A pneumatic tire has conventionally been known of which a rolling resistance is reduced by reducing a ratio between a tread contact width and a tire section width (tread contact width/tire section width) (Patent Document 1, for example).

Such a pneumatic tire has a small tread contact width relative to the tire section width, and thus has a shape in which a gentle curve is drawn from a tread portion to a sidewall portion. Thus, an angle formed by a sidewall portion near a tread portion and a road surface is small and accordingly, the distance between the sidewall portion and the road surface is short. Thus, the sidewall portion is likely to come in contact with the road surface when the tire contact width increases outwardly in the tread width direction during cornering, when the pneumatic tire steps on a curbstone, or when an internal pressure of the pneumatic tire is low, for example.

Thus, in the pneumatic tire of Patent Document 1 described above, the sidewall portion is formed of a rubber material having excellent durability to prevent the sidewall portion from being damaged.

However, forming the sidewall portion of the rubber material having the excellent durability leads to an increase in amount of heat in the sidewall portion. This causes an energy loss which in turn increases the rolling resistance.

PRIOR ART DOCUMENT

Patent Document

PATENT DOCUMENT 1: Japanese Patent Application Publication No. 2008-201379

A pneumatic tire according to the one characteristic comprising: a pair of bead portions, a carcass layer laid between the pair of bead portions; a tread portion positioned on an outer side of the carcass layer in a tire radial direction; and at least two belt layers positioned between the carcass layer and the tread portion. The at least two belt layers form an overlapping area where the two belt layers overlap one another. In a tread width direction cross section under a standard internal pressure and no load condition, a point B is an outermost point of the overlapping area in a tread width direction, a straight line CC is a straight line passing through an outermost point C' of the carcass layer in the tread width direction and extending along the tread width direction, a point C is a point of a tire surface through which the straight line CC passes, a line segment BW is a line segment extending in the tread width direction from an equator center line to the point B, a line segment CW is a line segment extending along the tread width direction from the equator center line to the point C, and a line segment BC is a line segment connecting between the point B and the point C. A ratio BW/CW between a length of the line segment BW and a length of the line segment CW is equal to or larger than 0.6 and equal to or smaller than 0.8, and an angle θ formed by the line segment BC and the line segment CW is equal to or larger than 50° and equal to or smaller than 70°.

In the one characteristic, the bead portions each include a bead toe that is an inner end portion of the bead portion in the tire radial direction. In the tread width direction cross section, a point S is a point of the tire surface through which the equator center line passes, a point T is an innermost point of the bead toe in the tire radial direction, a radial direction difference CH is a radial direction difference between the point C and the point T, and a radial direction difference SH is a radial direction difference between the point S and the point T, and a ratio CH/SH is a ratio between the radial direction difference CH and the radial direction difference SH. The ratio CH/SH is equal to or smaller than 0.50.

In the one characteristic, the bead portions each include a bead filler configured to enhance a rigidity of the bead portion. In the tread width direction cross section, a point U is an outermost point of the bead filler in the tire radial direction, and a radial direction difference UH is a radial direction difference between the point U and the point T. The radial direction difference UH is equal to or smaller than 25 mm.

In the one characteristic, when the pneumatic tire is mounted to a standard rim including a rim flange, in the tread width direction cross section, a point V is an outermost point of the rim flange in the tire radial direction, a straight line VV' is a straight line passing through the point V and extending along the tread width direction, and a point W is a point of the carcass layer provided on the straight line VV', and defines the center of the carcass layer in the tread width direction. A shortest distance between the tire surface and the point W is equal to or smaller than 2.8 mm.

In the one characteristic, in the tread width direction cross section, a point D is an outermost point of the overlapping area in the tire radial direction, and a radial direction difference BD is a radial direction difference between the point B and the point D in the tire radial direction. A ratio BD/BW between a length of the radial direction difference BD and a length of the line segment BW is equal to or larger than 0.02 and equal to or smaller than 0.1.

In the one characteristic, the ratio BD/BW is equal to or larger than 0.05 and equal to or smaller than 0.08.

In the one characteristic, in the tread width direction cross section, a point E is an outermost point of the tire surface in the tire radial direction, a point F is a point of the tire surface at which a straight line extending in the tire radial direction from the point B crosses the tire surface, and a radial direction difference EF is a radial direction difference between the point E and the point F in the tire radial direction. A ratio EF/BW between a length of the radial direction difference EF and a length of the line segment BW is equal to or larger than 0.05 and equal to or smaller than 0.15.

In the one characteristic, the ratio EF/BW is equal to or larger than 0.08 and equal to or smaller than 0.13.

In the one characteristic, in the tread width direction cross section, a point G is an outermost point of the at least two belt layers in the tread width direction, and a shift width BG is a shift width between the point B and the point G in the tread width direction. The shift width BG is equal to or larger than 1 mm and equal to or smaller than 15 mm.

In the one characteristic, the at least two belt layers include a spiral belt layer including a spiral cord extending along a tire circumferential direction. When a cord line forming the spiral cord is pulled at 40 N, a degree of extension of the cord line is equal to or smaller than 5%.

In the one characteristic, when the cord line forming the spiral cord is pulled at 40 N, the degree of extension of the cord line is equal to or smaller than 1.5%.

In the one characteristic, the at least one belt layer includes a belt layer including a cord inclined by 15 to 75° with respect to the tire circumferential direction, in addition to the spiral belt layer.

In the one characteristic, the at least one belt layer includes a pair of belt layers each including a cord that intersects the spiral cord, in addition to the spiral belt layer. The cord in each of the pair of belt layers is inclined by 45° to 80° with respect to the tire circumferential direction.

In the one characteristic, the at least one belt layer includes one layer of the spiral belt layer and two layers of the spiral belt layer respectively at a center portion and end portions of the tread portion in the tread width direction.

In the one characteristic, the cord line forming the spiral cord is made of steel or aramid.

In the one characteristic, in the tread width direction cross section, a point D is an outermost point of the spiral belt layer in the tire radial direction, the point B is an innermost point of the spiral belt layer in the tire radial direction, and a radial direction difference BD is a radial direction difference between the point B and the point D in the tire radial direction. In a tread width direction cross section under an extremely low internal pressure and no load condition, a ratio BD/BW between a length of the radial direction difference BD and a length of the line segment BW is equal to or larger than 0.005 and equal to or smaller than 0.04.

In the one characteristic, in the tread width direction cross section, a point D is an outermost point of the overlapping area in the tire radial direction, and a radial direction difference BD is a radial direction difference between the point B and the point D in the tire radial direction. In a tread width direction cross section under an extremely low internal pressure and no load condition, a ratio BD/BW between a length of the line segment BW and a length of the radial direction difference BD is equal to or larger than 0.05 and equal to or smaller than 0.10.

In the one characteristic, in a tread width direction cross section under a standard internal pressure and no load condition, a point E is an outermost point of a tire surface in the tire radial direction, a point F is a point of the tire surface at which a straight line extending in the tire radial direction from the point B crosses the tire surface, and a radial direction difference EF is a radial direction difference between the point E and the point F in the tire radial direction. A ratio EF/BW between a length of the radial direction difference EF and a length of the line segment BW is equal to or larger than 0.05 and equal to or smaller than 0.10.

In the one characteristic, a tread contact width GH is a tread contact width in a tread width direction cross section under an internal pressure obtained by subtracting 20 kPa from a maximum internal pressure and a load that is 80% of a maximum load determined by the internal pressure. A ratio BW/GH between a length of the line segment BW and a length of the tread contact width GH is equal to or larger than 1.0 and equal to or smaller than 1.3.

MODES FOR CARRYING OUT THE INVENTION

Pneumatic tires according to embodiments of the present invention are described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Overview of First Embodiment

A pneumatic tire according to a first embodiment includes a pair of bead portions, a carcass layer laid between the pair of bead portions, a tread portion positioned on an outer side of the carcass layer in a tire radial direction, and at least two belt layers positioned between the carcass layer and the tread portion. The at least two belt layers form an overlapping area where the belt layers overlap one another.

In a tread width direction cross section under a standard internal pressure and no load condition, a point B is an outermost point of the overlapping area in the tread width direction, a straight line CC is a straight line passing through an outermost point C' of the carcass layer in the tread width direction and extending in the tread width direction, a point C is a point of a tire surface through which the straight line CC passes, a line segment BW is a line segment extending along the tread width direction from an equator center line to the point B, a line segment CW is a line segment extending along the tread width direction from the equator center line to the point C, a line segment BC is a line segment connecting between the point B and the point C, and a ratio BW/CW between the length of the line segment BW and the length of the line segment CW is equal to or larger than 0.6 and equal to or smaller than 0.8. An angle θ formed by the line segment BC and the line segment CW is equal to or larger than 50° and equal to or smaller than 70°.

In the first embodiment, the angle θ formed by the line segment BC and the line segment CW is equal to or larger than 50° and equal to or smaller than 70°. With the angle θ being equal to or larger than 50°, a sidewall portion 50 is prevented from being damaged. With the angle θ being equal to or smaller than 70°, a rolling resistance improves.

In the first embodiment, the ratio BW/CW is equal to or larger than 0.6 and equal to or smaller than 0.8. With the ratio BW/CW being equal to or larger than 0.6, degradation of driving stability is prevented. With the ratio BW/CW being equal to or smaller than 0.8, the rolling resistance improves.

It is to be noted that, "standard internal pressure" is a pneumatic pressure corresponding to the maximum load capacity defined by JATMA.

Detail of First Embodiment (Configuration of Pneumatic Tire)

Figure 1:
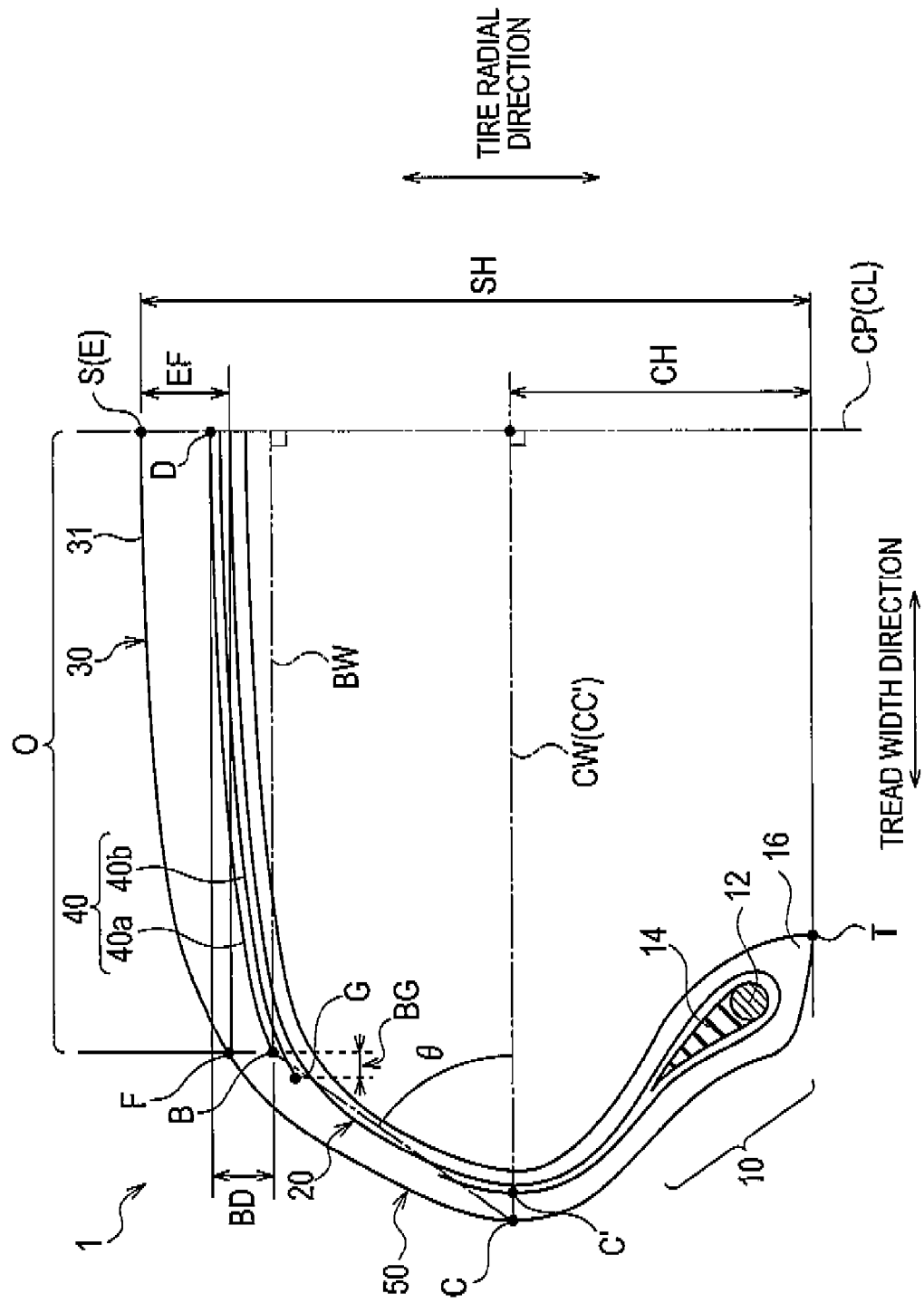
FIG. 1 is a tread-width-direction cross-sectional view of a pneumatic tire 1 according to a first embodiment.
Figure 2:
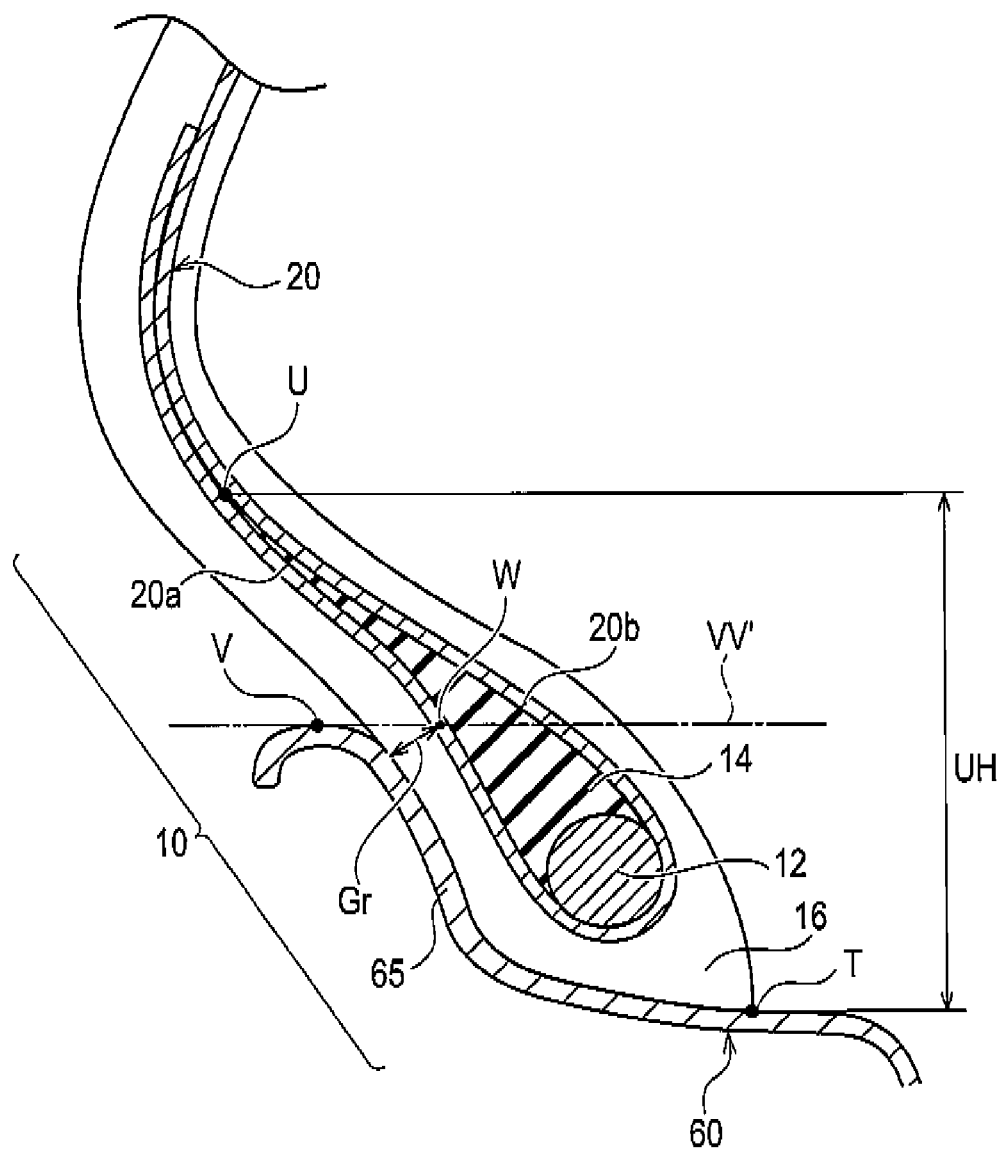
FIG. 2 is a tread-width-direction cross-sectional view of a portion around a bead portion 10 according to the first embodiment.

A configuration of the pneumatic tire according to the first embodiment is described below with reference to the drawings. FIG. 1 is a tread-width-direction cross-sectional view of a pneumatic tire 1 according to the first embodiment. FIG. 2 is a tread-width-direction cross-sectional view of a portion around a bead portion 10 according to the first embodiment.

The tread width direction cross section is across section taken along the tread width direction and a tire radial direction. FIG. 1 shows only one of sides of the pneumatic tire 1 symmetrical with respect to the equator center plane CP (i.e., equator center line CL in the tread width direction cross section).

FIG. 2 shows a state where the pneumatic tire 1 is mounted to a rim 60 including a rim flange 65.

It is to be noted that, in the embodiment, a description is mainly given on the pneumatic tire 1 under a standard internal pressure and no load condition.

As shown in FIG. 1, the pneumatic tire 1 includes a pair of bead portions 10, a carcass layer 20, a tread portion 30, belt layers 40, and sidewall portions 50.

The bead portions 10 each include a bead core 12, an adjoining bead filler 14, and a bead toe 16. The bead core 12 is provided to fix the pneumatic tire 1 onto the rim 60. The bead core 12 includes a bead wire (not shown). The bead filler 14 is provided to enhance the rigidity of the bead portion 10. The bead filler 14 as well as the bead core 12 are covered by the carcass layer 20. The bead toe 16 is an inner end portion of the bead portion 10 in the tire radial direction.

The carcass layer 20 is laid between the pair of bead portions 10. The carcass layer 20 is bent outward in the tread width direction while covering the bead core 12 and the bead filler 14 in the bead portion 10.

The carcass layer 20 includes a cord bundle formed by twisting cord lines made of PET (Polyethylene Terephthalate) or the like. The cord bundle is arranged along a direction perpendicular to the equator center plane CP. Thus, the carcass layer 20 has a radial structure.

As shown in FIG. 2, the carcass layer 20 includes an outer carcass portion 20a and an inner carcass portion 20b. The outer carcass portion 20a is a portion of the carcass layer 20, bent outwardly in the tread width direction. The inner carcass portion 20b is a portion of the carcass layer 20, on the inner side in the tread width direction and over lapped with the outer carcass portion 20a.

The tread portion 30 is positioned on the outer side of the carcass layer 20 in the tire radial direction. The tread portion 30 includes a tread contact surface 31 to be in contact with a road surface under the standard internal pressure and no load condition.

The belt layers 40 are each formed by covering a plurality of cords arranged in parallel with a rubber piece. The belt layers 40 are positioned between the carcass layer 20 and the tread portion 30. The belt layers 40 include two layers of a first belt 40a and a second belt 40b. The first belt 40a is shorter in the tread width direction than the second belt 40b. The first belt 40a and the second belt 40b form an overlapping area O. The overlapping area O is an area where the first belt 40a and the second belt 40b overlap one another in the tire radial direction.

The sidewall portions 50 are formed on both ends of the tread portion 30 in the tread width direction. The sidewall portions 50 are each positioned between the bead portion 10 and the tread portion 30.

(External Shape of Pneumatic Tire)

An external shape of the pneumatic tire according to the first embodiment is described with reference to FIG. 1 and FIG. 2.

Firstly, as shown in FIG. 1, terms in the tread width direction cross section are defined as follows.

Point B: an outermost point of the overlapping area O in the tread width direction (in other words, an outermost point of the first belt 40a in the tread width direction)

Point C': an outermost point of the carcass layer in the tread width direction (a point defining the carcass section width)

Straight line CC: a straight line passing through the point C' and extending along the tread width direction (in other words, a straight line perpendicular to the equator center plane CP and passing through the point C)

Point C: a point of a tire surface through which the straight line CC passes

Line segment BW: a line segment extending in the tread width direction from the equator center plane CP to the point B (in other words, a line segment perpendicular to the equator center plane CP and reaches the point B from the equator center plane CP, or a line segment defining the shortest distance between the point B and the equator center plane CP)

Line segment CW: a line segment extending along the tread width direction from the equator center plane CP to the point C (in other words, a line segment perpendicular to the equator center plane CP and reaches the point C from the equator center plane CP, or a line segment defining the shortest distance between the point C and the equator center plane CP)

Line segment BC: a line segment connecting between the point B and the point C

Point S: a point of the tire surface through which the equator center plane CP passes Point T: an innermost point of the bead toe 16 in the tire radial direction Radial direction difference CH: a radial direction difference between the point C (point C') and the point T (in other words, a height to the point (point C') defining the carcass section width in the tire radial direction (hereinafter also referred to as "carcass section width height"))

Radial direction difference SH: a radial direction difference between the point S and the point T (in other words, a height to the point S in the tire radial direction (hereinafter also referred to as "tire section height"))

Point D: an outermost point of the overlapping area O in the tire radial direction Point E: an outermost point of the tire surface in the tire radial direction (the point E is the same point as the point S)

Point F: a point of the tire surface at which a straight line extending in the tire radial direction from the point B crosses the tire surface Point G: an outermost point of the belt layers 40 including at least two belts in the tread width direction (in other words, an outermost point of the second belt 40b in the tread width direction)

Radial direction difference BD: a radial direction difference between the point B and the point D in the tire radial direction Radial direction difference EF: a radial direction difference between the point E and the point F Shift width BG: a shift width between the point B and the point G in the tread width direction (in other words, the shift width between the first belt 40a and the second belt 40b)

The ratio BW/CW, which is a ratio between the length of the line segment BW and the length of the line segment CW is equal to or larger than 0.6 and equal to smaller than 0.8. With the ratio BW/CW being equal to or larger than 0.6, an area of a tread contact surface 31 is secured, and thus the degradation of the driving stability is prevented. With the ratio BW/CW being equal to or smaller than 0.8, increase in the amount of the rubber material (rubber material having excellent durability and high heat emission property) forming the overlapping area O is prevented. In other words, the increase in the amount of the rubber material forming the belt layers 40 is prevented and the energy loss due to the heat emission by the rubber material is prevented. Thus, the rolling resistance improves.

The angle θ formed by the line segment BC and the line segment CW is equal to or larger than 50° and equal to or smaller than 70°. With the angle θ being equal to larger than 50°, an angle formed by the sidewall portion 50 near the tread portion 30 and the road surface is large. Thus, the distance between the sidewall portion 50 and the road surface is long. Accordingly, the sidewall portion 50 is prevented from coming in contact with the road surface, whereby the sidewall portion 50 is less likely to come in contact with a foreign object on the road surface. As a result, the sidewall portion 50 is prevented from being damaged. With the angle θ being equal to or smaller than 70°, the increase in the amount of the rubber material (rubber material likely to emit heat) forming the overlapping area O is prevented. In other words, the increase in the amount of the rubber material forming the belt layers 40 is prevented and the energy loss due to the heat emission by the rubber material is prevented. Thus, the rolling resistance improves.

A ratio CH/SH between the radial direction difference CH and the radial direction difference SH is preferably equal to or smaller than 0.50 so that the carcass section width height is not larger than half of the of the tire section height. Thus, the point (point C') defining the carcass section width is provided on the inner side in the tire width direction, whereby the ratio BW/CW can be within the range from 0.6 to 0.8 inclusive and the angle θ can be within the range from 50° to 70° inclusive with no excessive stress applied to the carcass layer 20.

A ratio BD/BW between the length of the radial direction difference BD and the length of the line segment BW is preferably equal to or larger than 0.02 and equal to or smaller than 0.1. The ratio BD/BW is more preferably equal to or larger than 0.05 and equal to or smaller than 0.08.

A ratio EF/BW between the length of the radial direction difference EF and the length of the line segment BW is preferably equal to or larger than 0.05 and equal to or smaller than 0.15. The ratio EF/BW is more preferably equal to or larger than 0.08 and equal to or smaller than 0.13

The shift width BG is preferably equal to or larger than 1 mm and equal to or smaller than 15 mm.

Secondly, as shown in FIG. 2, terms in the tread width direction cross section are defined as follows.

Point U: an outermost point of the bead filler 14 in the tire radial direction.

Radial direction difference UH: a radial direction difference between the point U and the point T (in other words, a height to the point U in the tire radial direction (hereinafter also referred to as "bead filler height")).

Point V: an outermost point of the rim flange 65 in the tire radial direction.

Straight line VV': a straight line passing through the point V and extending along the tread width direction (in other words, a straight line perpendicular to the equator center plane CP and passes through the point V)

Point W: a point of the outer carcass portion 20a, on the straight line VV', and defining the center of the outer carcass portion 20a in the tread width direction (a center point of the outer carcass portion 20a in the thickness direction)

Gauge thickness Gr: a thickness of the rubber piece provided on the outer side of the outer carcass portion 20a (in other words, the shortest distance between the point W and the tire surface)

The radial direction difference UH is preferably equal to or smaller than 25 mm so that the carcass layer 20 can be bent without being hindered by the bead filler 14 even when the point (point C') defining the carcass section width is brought closer to the bead portion 10. In other words, the carcass layer 20 can be bent without being hindered by the bead filler 14 even when the point (point C') defining the carcass section width is disposed on the inner side in the tire radial direction. Thus, the ratio BW/CW can be within the range from 0.6 to 0.8 inclusive and the angle θ can be within the range from 50° to 70° inclusive with no excessive stress applied to the carcass layer 20.

Generally, the bead filler has a function of enhancing the rigidity of the bead portion and thus has a high rigidity. The carcass section width is defined by bending the carcass. It is difficult to bend the highly rigid bead filler, and thus bringing the point defining the carcass section width close to the bead portion is difficult. This is the reason why the angle θ had to be smaller than 50° in the conventional technique.

The gauge thickness Gr is preferably equal to smaller than 2.8 mm. Thus, the distance between the rim flange 65 and the outer carcass portion 20a is short, and at the point W, inclination of the outer carcass portion 20a (carcass layer 20) with respect to the tire radial direction is large. Accordingly, the radial direction difference CH along the tire radial direction can be made short, without making the length of the line segment CW along the tread width direction short. Thus, the ratio BW/CW can be within the range from 0.6 to 0.8 inclusive and the angle θ can be within the range from 50° to 70° inclusive with no excessive stress applied to the carcass layer 20.

It is to be noted that, if the distance between the rim flange 65 and the outer carcass portion 20a is long and the inclination of the outer carcass portion 20a (carcass portion 20) with respect to the tire radial direction is small at the point W, the line segment CW along the tread width direction has to be made short to make the radial direction difference CH along the tire radial direction short.

(Operation and Effect)

In the first embodiment, the angle θ formed by the line segment BC and the line segment CW is equal to or larger than 50° and equal to or smaller than 70°. With the angle θ being equal to or larger than 50°, the sidewall portion 50 is prevented from being damaged. With the angle θ being equal to or smaller than 70°, the rolling resistance improves.

In the first embodiment, the ratio BW/CW is equal to or larger than 0.6 and equal to or smaller than 0.8. With the ratio BW/CW being equal to or larger than 0.6, degradation of driving stability is prevented. With the ratio BW/CW being equal to or smaller than 0.8, the rolling resistance improves.

In the first embodiment, the ratio CH/SH is equal to or smaller than 0.50. Thus, the ratio BW/CW can be within the range from 0.6 to 0.8 inclusive and the angle θ can be within the range from 50° to 70° inclusive with no excessive stress applied to the carcass layer 20.

In the first embodiment, the radial direction difference UH is equal to or smaller than 25 mm. Thus, the ratio BW/CW can be within the range from 0.6 to 0.8 inclusive and the angle θ can be within the range from 50° to 70° inclusive with no excessive stress applied to the carcass layer 20.

In the first embodiment, the gauge thickness Gr is equal to or smaller than 2.8 mm at the point W. Thus, the ratio BW/CW can be within the range from 0.6 to 0.8 inclusive and the angle θ can be within the range from 50° to 70° inclusive with no excessive stress applied to the carcass layer 20.

[Evaluation Result]

Evaluation results of Examples and Comparative Examples are described below. Table 1 shows details of Conventional Example, Comparative Examples, and Examples.

TABLE 1

| | θ (degree) | BW (mm) | CW (mm) | BW/CW | CWH (mm) | SH (mm) | CWH/SH | BFH (mm) | Gr (mm) |
|---|---|---|---|---|---|---|---|---|---|
| Conventional Example | 57 | 185 | 225 | 0.82 | 54 | 98 | 0.55 | 35 | 3.2 |
| Comparative Example 1 | 45 | 165 | 228 | 0.72 | 54 | 98 | 0.55 | 35 | 3.2 |
| Comparative Example 2 | 40 | 130 | 228 | 0.57 | 44 | 98 | 0.45 | 18 | 2.5 |
| Comparative Example 3 | 44 | 136 | 228 | 0.60 | 43 | 98 | 0.44 | 18 | 2.5 |
| Example 1 | 50 | 165 | 228 | 0.72 | 47 | 98 | 0.48 | 35 | 3.2 |
| Example 2 | 51 | 165 | 228 | 0.72 | 46 | 98 | 0.47 | 25 | 3.2 |
| Example 3 | 52 | 165 | 228 | 0.72 | 45 | 98 | 0.46 | 18 | 3.2 |
| Example 4 | 53 | 165 | 228 | 0.72 | 43 | 98 | 0.44 | 18 | 2.5 |
| Example 5 | 61 | 182 | 228 | 0.80 | 43 | 98 | 0.44 | 18 | 2.5 |
| Example 6 | 50 | 165 | 225 | 0.73 | 49 | 98 | 0.50 | 35 | 3.2 |

(Common Condition)
Size of pneumatic tire=225/45R17
Internal pressure of pneumatic tire=230 kPa
Belt layer=belt layer including steel cord×two layers
Rim width=7.5 J (Standard size defined by JATMA)

Conventional Example

As shown in Table 1, the ratio BW/CW in the pneumatic tire of Conventional Example is 0.82 and thus is not within the range from 0.6 to 0.8. The ratio CH/SH is 0.55 and thus is larger than 0.5. The radial direction difference UH is 35 mm and thus is larger than 25 mm. The gauge thickness Gr is 3.2 mm and thus is larger than 2.8 mm.

Comparative Example 1

As shown in Table 1, angles θ in pneumatic tires according to Comparative Examples 1 to 3 are 40°, 44° and 45° and thus are not within the range from 50 to 70. As shown in Table 1, the ratio BW/CW in the pneumatic tire according to Comparative Example 2 is 0.57 and thus is not within the range from 0.6 to 0.8.

Examples 1 to 6

As shown in Table 1, angles θ in the pneumatic tires according to Examples 1 to 6 are 50°, 51°, 52°, 53°, and 61° and thus are within the range from 50° to 70°. The ratios BW/CW are 0.72, 0.73, and 0.80 and thus are within the range from 0.6 to 0.8. The ratios CH/SH are 0.44, 0.46, 0.47, 0.48, and 0.50 and thus are not larger than 0.50.

It is to be noted that the radial direction difference UH in the pneumatic tires according to Examples 1 and 6 is 35 mm and thus is larger than 25 mm. The gauge thickness Gr of the pneumatic tires according to Examples 1 to 3 is 3.2 mm and thus is larger than 2.8 mm.

(Evaluation Method)
"Rolling resistance" and "damage on sidewall portion" were evaluated with the pneumatic tires according to Conventional Example, Comparative Examples 1 to 3, and Examples 1 to 6 each mounted to a rim having a rim width of a standard size=7.5 J defined by JATMA.

Firstly, a measurement method for "rolling resistance" is described. A rolling resistance of a shaft forming a rotational shaft of the pneumatic tire was obtained by using a drum tester having a steel plate surface and a diameter of 1.7 m. Specifically, the rolling resistance of the shaft was obtained with each pneumatic tire pressed against the steel plate surface of the drum under the condition of 80 Km/H.

With "rolling resistance" of the pneumatic tire according to Conventional Example being "100", "rolling resistances" of other pneumatic tires are shown as indexes. A smaller value of "rolling resistance" indicates a smaller rolling resistance. It is considered that there is a significant improvement when the value of "rolling resistance" is reduced by 5%. It is considered to be very effective when the value of "rolling resistance" is reduced by 10%.

Secondly, an evaluation method for "damage on sidewall portion" is described. Each pneumatic tire was mounted to a vehicle of 2500 cc displacement. The vehicle ran for 2000 km on a bad road where a number of sharp stones are present. With "damage (the number of scars) on sidewall portion" of the pneumatic tire according to Conventional Example being "100", "damage (the number of scars) on sidewall portion" of each of other pneumatic tires is shown as an index. A smaller value of "damage (the number of scars) on sidewall portion" indicates less damage on the sidewall portion.

When the pneumatic tire goes flat while the vehicle is running, the flat pneumatic tire was replaced with a new pneumatic tire. In such a case, the number of scars on the flat pneumatic tire and the number of scars on the newly mounted pneumatic tire were added.
(Evaluation Result)
Table 2 shows the evaluation results of "rolling resistance" and "damage on sidewall portion".

TABLE 2

| | Rolling resistance | Damage on sidewall portion |
|---|---|---|
| Conventional Example | 100 | 100 |
| Comparative Example 1 | 91 | 620 |
| Comparative Example 2 | 87 | 780 |
| Comparative Example 3 | 87 | 680 |
| Example 1 | 90 | 150 |
| Example 2 | 90 | 140 |
| Example 3 | 89 | 130 |
| Example 4 | 89 | 120 |
| Example 5 | 95 | 80 |
| Example 6 | 90 | 150 |

As shown in Table 2, the ratios BW/CW in Comparative Examples 1 to 3 are not larger than 0.8. Thus, it can be found that "rolling resistance" is about 90% of that of Conventional Example and thus improved by about 10% from that in Conventional Example. However, the angle θ is smaller than 50° and "damage on sidewall portion" is about 6 to 8 times as large as that in Conventional Example and it can be found that "damage on sidewall portion" largely degraded from that in Conventional Example.

The ratios BW/CW in Examples 1 to 6 are not larger than 0.8. Thus, it can be found that "rolling resistance" is about 90% of that in Conventional Example and thus improved by about 10% from that in Conventional Example. In addition, the angle θ is equal to or larger than 50° and "damage on sidewall portion" is not larger than about ¼ of those in Comparative Examples 1 to 3 and thus it can be found that "damage on sidewall portion" improved from those in Comparative Examples 1 to 3.

The ratios CH/SH in Examples 1 to 6 are not larger than 0.5. Thus the ratio BW/CW can be within the range from 0.6 to 0.8 inclusive, and the angle θ can be within the range from 50° to 70° inclusive.

Especially, in Example 5, the ratio CH/SH is not larger than 0.44, and thus the angle θ can be equal to or larger than 60°. Therefore, it can be found that "rolling resistance" and "damage on sidewall portion" are improved from that in Conventional Example.

Thus, it is confirmed that both "reduction of rolling resistance" and "prevention of damage on sidewall portion" are achieved when the angel e is within the range from 50° to 70° and the ratio BW/CW is within the range from 0.6 to 0.8.

Overview of Second Embodiment

A pneumatic tire according to a second embodiment includes a pair of bead portions, a carcass layer laid between the pair of bead portions, a tread portion positioned on an outer side of the carcass layer in the tire radial direction, and at least one belt layer positioned between the carcass layer and the tread portion. The at least one belt layer includes a spiral belt layer having a spiral cord extending along a tire circumferential direction.

In a tread width direction cross section under a standard internal pressure and no load condition, a point B is an outermost point of the spiral belt layer in the tread width direction, a straight line CC is a straight line passing through an outermost point C' of the carcass layer in the tread width direction and extending in the tread width direction, a point C is a point of a tire surface through which the straight line CC passes, a line segment BW is a line segment extending in the tread width direction from an equator center plane to the point B, a line segment CW is a line segment extending in the tread width direction from the equator center plane to the point C, a line segment BC is a line segment connecting between the point B and the point C. The ratio BW/CW between the length of the line segment BW and the length of the line segment CW is equal to or larger than 0.6 and equal to or smaller than 0.8. The angle θ formed by the line segment BC and the line segment CW is equal to or larger than 50° and equal to or smaller than 70°. When a cord line forming the spiral cord is pulled at 40 N, the degree of elongation of the cord line is not larger than 5%.

In the second embodiment, the angle θ formed by the line segment BC and the line segment CW is equal to or larger than 50° and equal to or smaller than 70°, and the ratio BW/CW is equal to or larger than 0.6 and equal to or smaller than 0.8. Thus, as in the first embodiment, both prevention of damage on the sidewall portion and reduction of the rolling resistance can be achieved.

In the second embodiment, when a cord line forming the spiral cord is pulled at 40 N, the degree of elongation (spiral rigidity) of the cord line is not larger than 5%. Thus, an end portion of the tread contact surface in the tread width direction is prevented from bulging in the tire radial direction, and thus "uneven wear" is reduced.

"Uneven wear" is a wear ratio between a center portion of the tread contact surface in the tread width direction and the end portion of the tread contact surface in the tread width direction.

Detail of Second Embodiment

The second embodiment is described below in detail. Hereinafter, differences from the first embodiment are mainly described.

Specifically, while the belt layers 40 include two belt layers in the first embodiment, the belt layer 40 includes at least one belt layer in the second embodiment. The at least one belt layer 40 includes a spiral belt layer having a spiral cord. When a cord line forming the spiral cord is pulled at 40N, the degree of elongation of the cord line is not larger than 5%.

(Configuration of Pneumatic Tire)

Figure 3:
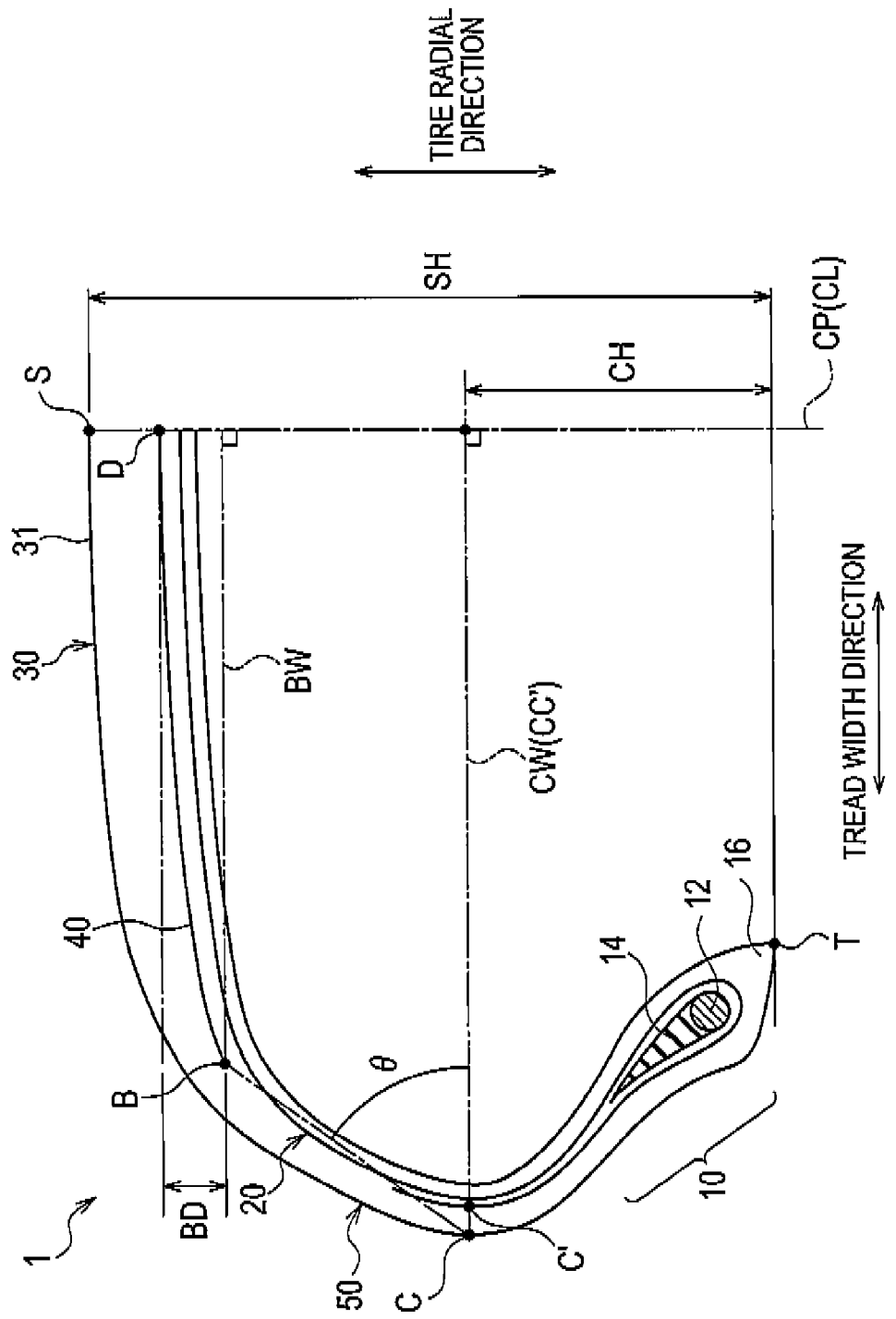
FIG. 3 is a tread-width-direction cross-sectional view of a pneumatic tire 1 according to a second embodiment.

A configuration of the pneumatic tire according to the second embodiment is described below with reference to the drawings. FIG. 3 is a tread-width-direction cross-sectional view of a pneumatic tire 1 according to the second embodiment.

As shown in FIG. 3, the pneumatic tire 1 includes bead portions 10, a carcass layer 20, a tread portion 30, a belt layer 40, and sidewall portions 50, as in the first embodiment. The components other than the belt layer 40 are the same as those in the first embodiment and thus the description thereof is omitted.

The belt layer is at least one belt layer and includes the spiral cord layer including the spiral cord. The spiral cord is formed by spirally twisting a plurality of the cord lines.

When the cord line forming the spiral cord layer is pulled at 40N, the degree of elongation (spiral rigidity) of the cord line is equal to or smaller than 5%. When the cord line forming the spiral cord layer is pulled at 40N, the degree of elongation (spiral rigidity) of the cord line is preferably equal to or smaller than 1.5%.

With the spiral rigidity being equal to or smaller than 5%, the end portion of the tread contact surface in the tread width direction is prevented from bulging in the tire radial direction, and thus "uneven wear" is reduced. If the spiral rigidity is equal to or smaller than 1.5%, "uneven wear" is further reduced.

The cord lines forming the spiral cord are made of PET (Polyethylene terephthalate), steel, or aramid. The cord lines forming the spiral cord are particularly preferably made of steel or aramid.

Figure 4:
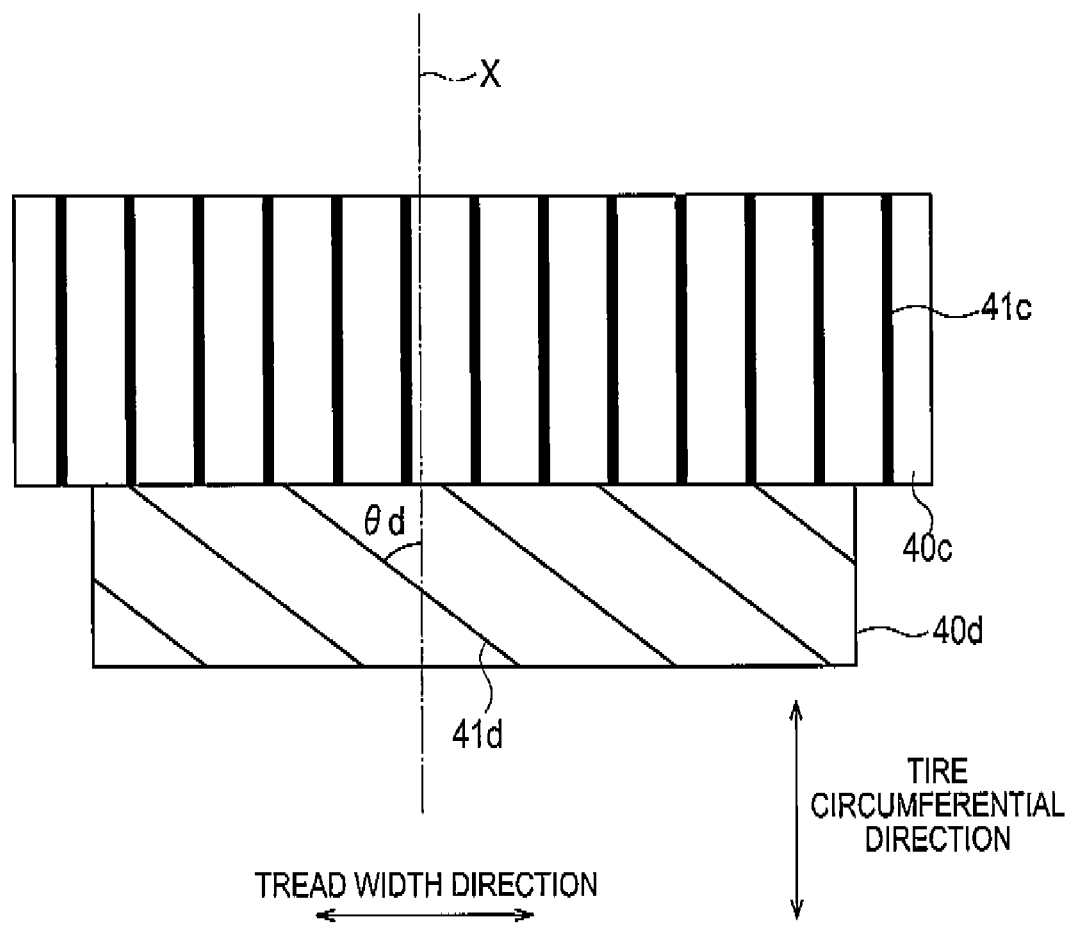
FIG. 4 is a diagram showing belt layers 40 according to the second embodiment.

Firstly, a case is described where the belt layer 40 includes one belt layer in addition to the spiral belt layer with reference to FIG. 4. FIG. 4 is a diagram of the pneumatic tire 1 viewed from the outer side in the tire radial direction. In FIG. 4, the tread portion 30 is partly omitted.

As shown in FIG. 4, the belt layer 40 includes a spiral belt layer 40c and a normal belt layer 40d.

The spiral belt layer 40c includes spiral cords 41c that extend along the tire circumferential direction (straight line X along the tire circumferential direction). An interval among the spiral cords 41c adjacent to each other (specifically distance between cord centers) is in the range from 0.8 to 2.0 mm. With the distance between the cord centers being equal to or larger than 0.8 mm, the spiral cords adjacent to each other can be prevented from coming in contact due to production tolerance. Thus, a case can be prevented where the spiral cords 41c are rubbed on each other to be damaged and being broken by the continuous running. With the distance between the cord centers being equal to or smaller than 2.0 mm, rigidity is secured and the end portion of the tread contact surface in the tread width direction can be prevented from bulging in the tire radial direction.

The normal belt layer 40d includes normal cords 41d inclined by an angle $\theta_d$ of 15° to 75° with respect to the tire circumferential direction (straight line X along the tire circumferential direction). The normal cords 41d may not have a spiral structure.

Figure 5:
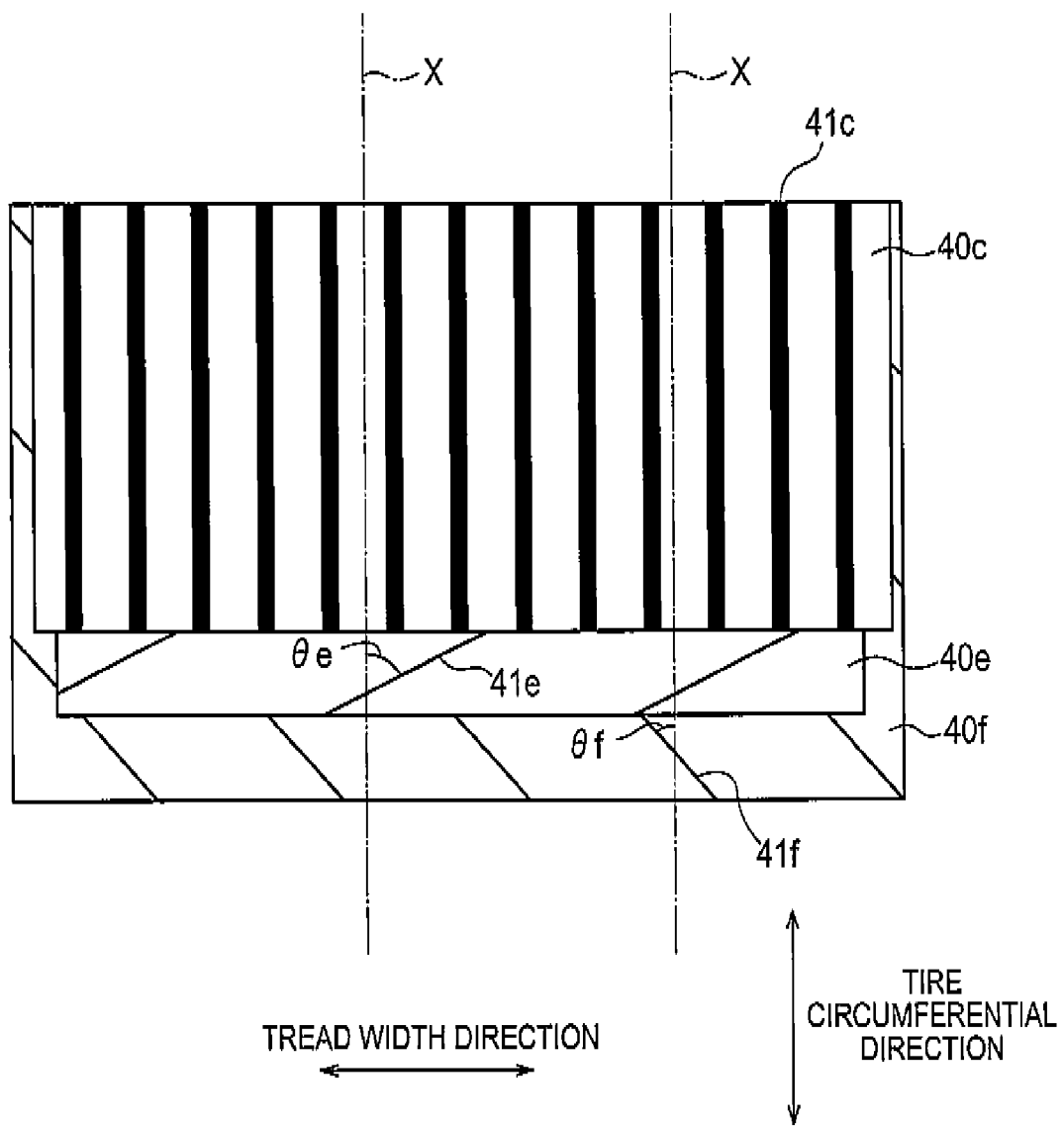
FIG. 5 is a diagram showing the belt layers 40 according to the second embodiment.

Secondly, a case is described where the belt layer 40 includes a pair of belt layers in addition to the spiral belt layer with reference to FIG. 5. FIG. 5 is a diagram of the pneumatic tire 1 viewed from the outer side in the tire radial direction. In FIG. 5, the tread portion 30 is partly omitted.

As shown in FIG. 5, the belt layer 40 includes the spiral belt 40c, a normal belt layer 40e, and a normal belt layer 40f.

The normal belt layer 40e includes normal cords 41e, and the normal belt 40f includes normal cords 41f. The normal cords 41e are each inclined by an angle $\theta_e$ of 45° to 80° with respect to the tire circumferential direction (straight line X along the tire circumferential direction). The normal cords 41f are each inclined by an angle $\theta_f$ of 45° to 80° with respect to the tire circumferential direction (straight line X along the tire circumferential direction). The normal cords 41e and the normal cords 41f cross each other. The normal cords 41e and the normal cords 41f may not have the spiral structure.

In the second embodiment, the belt layer 40 includes another belt layer in addition to the spiral belt 40c. However, the second embodiment is not limited to this. The other belt may be omitted and the belt layer 40 may include only the spiral belt layer 40c.

(External Shape of Pneumatic Tire)

An external shape of the pneumatic tire according to the second embodiment is described with reference to FIG. 3.

As shown in FIG. 3, terms in the tread width direction cross section are defined as follows. FIG. 3 exemplifies a case where the belt layer 40 is the spiral belt layer 40c including the spiral cord 41c.

Point B: an outermost point of the spiral belt 40c in the tread width direction

Point D: an outermost point of the spiral belt 40c in the tire radial direction

Radial direction difference BD: a radial direction difference between the point B and the point D in the tire radial direction It is to be noted that the point B is the innermost point of the spiral belt 40C in the tire radial direction.

The other terms are the same as the counterparts in the first embodiment and thus the description thereof is omitted.

Here, in a tread width direction cross section under an extremely low internal pressure and no load condition, the ratio BD/BW between the length of the radial direction difference BD and the length of the line segment BW is preferably equal to or larger than 0.005 and equal to or smaller than 0.04. It is to be noted that "extremely low internal pressure" indicates an internal pressure of about 30 kPa.

With the ratio BD/BW being equal to or larger than 0.005, when the internal pressure is increased, e.g., up to standard internal pressure, the pressure (contact pressure) of the contact between the end portion of the tread contact surface in the tread width direction and the road surface is not too high. Thus, degradation of the uneven wear characteristics due to the increase in the width of the tread contact surface 31 (increase in the contact pressure) is prevented. Meanwhile, with the ratio BD/BW being equal to or smaller than 0.04, when the internal pressure is increased, e.g., up to the standard internal pressure, the difference (hereinafter, circumferential length difference) in the size in the tire radial direction between the center portion of the tread contact surface 31 in the tread width direction and the end portion of the tread contact surface 31 in the tread width direction is not too large. Thus, shear deformation of the tread portion 30 due to the anti-elasticity of the spiral cord 41c having a high rigidity and the circumferential length difference can be prevented. Since the shear deformation is prevented, the degradation of the rolling resistance is prevented.

(Operation and Effect)

In the second embodiment, the angle θ formed by the line segment BC and the line segment CW is equal to or larger than 50° and equal to or smaller than 70° and the ratio BW/CW is equal to or larger than 0.6 and equal to or smaller than 0.8. Thus, as in the first embodiment, both prevention of damage on the sidewall portion and reduction of the rolling resistance can be achieved.

In the second embodiment, when the cord line forming the spiral cord is pulled at 40 N, the degree of elongation (spiral rigidity) of the cord line is not larger than 5%. Thus, the end portion of the tread contact surface in the tread width direction is prevented from bulging in the tire radial direction, and thus "uneven wear" is reduced.

[Evaluation Result]

Evaluation results of Examples and Comparative Examples are described below. Table 3 shows evaluation results of Conventional Example, Comparative Examples, and Examples.

TABLE 3

|  | Spiral cord rigidity | Spiral cord material | Inclination Belt layer | BW | BD | BD/BW | Rolling resistance | Uneven wear |
| --- | --- | --- | --- | --- | --- | --- | --- | --- |
| Conventional Example | 5.1 | nylon | 28 degrees intersect | 165 | 7 | 0.042 | 100 | 2.2 |
| Example 1 | 2.5 | PET | 28 degrees intersect | 165 | 7 | 0.042 | 101 | 1.7 |
| Example 2 | 1.1 | aramid | 28 degrees intersect | 165 | 7 | 0.042 | 104 | 1.3 |
| Example 3 | 0.8 | steel | 28 degrees intersect | 165 | 7 | 0.042 | 104 | 1.4 |
| Example 4 | 0.8 | steel | 65 degrees intersect | 165 | 7 | 0.042 | 102 | 1.4 |

TABLE 3-continued

|  | Spiral cord rigidity | Spiral cord material | Inclination Belt layer | BW | BD | BD/BW | Rolling resistance | Uneven wear |
|---|---|---|---|---|---|---|---|---|
| Example 5 | 0.8 | steel | 38 degrees single layer | 165 | 7 | 0.042 | 102 | 1.4 |
| Example 6 | 0.8 | steel | 38 degrees single layer | 165 | 5 | 0.030 | 96 | 1 |
| Example 7 | 0.8 | steel | 38 degrees single layer | 165 | 3 | 0.018 | 91 | 1 |
| Example 8 | 0.8 | steel | 38 degrees single layer | 165 | 1 | 0.006 | 93 | 1.1 |
| Example 9 | 0.8 | steel | 38 degrees single layer | 165 | 0.6 | 0.004 | 101 | 1.4 |

(Common Condition)
Size of pneumatic tire=225/45R17
Internal pressure of pneumatic tire=230 kPa
Rim width=7.5 J (Standard size defined by JATMA)

Conventional Example

The pneumatic tire of Conventional example includes a pair of belt layers including cords that cross each other in addition to the spiral belt layer including the spiral cord. A material (hereinafter, spiral material) of the spiral cord is nylon. Rigidity (hereinafter, spiral rigidity) of the spiral cord is 5.1% and thus is not smaller than 5%.

The spiral rigidity is a value obtained by dividing the length of one of the cords forming the spiral cord elongated by being pulled at 40N by the length of the cord before being pulled at 40N (unit %).

Examples 1 to 9

The pneumatic tires according to Examples 1 to 4 each include a pair of belt layers including cords crossing one another in addition to the spiral belt layer including the spiral cord. The spiral rigidities are 0.8%, 1.1%, and 2.5%, and thus are not larger than 5%.

The pneumatic tires according to Examples 5 to 9 each include a single layer belt layer in addition to the spiral belt layer including the spiral cord. The spiral rigidity is 0.8%, and thus is not larger than 5%.

(Evaluation Method)

"Rolling resistance" and "uneven wear" are evaluated with pneumatic tires according to Conventional Example and Examples 1 to 9 each mounted to a rim having a rim width of a standard size=7.5 J defined by JATMA.

Firstly, a measurement method for "rolling resistance" is described. A rolling resistance of a shaft forming a rotational shaft of the pneumatic tire is obtained by using a drum tester having a steel plate surface and a diameter of 1.7 m. Specifically, the rolling resistance of the shaft is obtained with the each pneumatic tire pressed against the steel plate surface of the drum under the condition of 80 Km/H.

With "rolling resistance" of the pneumatic tire according to Conventional Example being "100", "rolling resistances" of other pneumatic tires are shown as indexes. A smaller value of "rolling resistance" indicates a smaller rolling resistance. It is considered that there is a significant improvement when the value of "rolling resistance" is reduced by 5%. It is considered to be very effective when the value of "rolling resistance" is reduced by 10%.

Secondly, a measuring method for "uneven wear" is described. With the drum tester having the steel plates surface and the diameter of 1.7 m, a wear ratio between the center portion of the tread contact surface in the tread width direction and the end portion of the tread contact surface in the tread width direction is obtained. Specifically, a ten minutes test under a condition where no acceleration is applied in a braking direction (free rolling condition) and a ten minutes test under a condition where an acceleration of 0.1 G is applied in the braking direction were alternately performed. A running distance was 5000 km. The wear is obtained from a difference in a depth of a groove on the tread contact surface between before and after the test.

"Uneven wear" is a wear ratio. "1" indicates that the center portion and the end portion of the tread contact surface are evenly worn. A value smaller than "1" indicates that the center portion of the tread contact surface is more worn than the end portion of the tread contact surface. A value larger than "1" indicates that the end portion of the tread contact surface is more worn than the center portion of the tread contact surface.

It is regarded that the uneven wear characteristic is bad when the value of "uneven wear" is equal to or smaller than 0.5 or equal to or larger than 2.0.

(Evaluation Result)

As shown in Table 3, the spiral rigidities of Examples 1 to 9 are not larger than 5%. Thus, the end portion of the tread contact surface 31 in the tread width direction is prevented from bulging in the tire radial direction, and it is found that "uneven wear" is reduced by 60% or more from that in Conventional Example. "Rolling resistances" of Examples 1 to 5 and 9, are degraded by several % from that in Conventional Example. Still, it is to be noted that the reduction of "uneven wear" is at a higher level.

The ratios BD/BW in Examples 6 to 8 are 0.006 to 0.030, and thus are within the range from 0.005 to 0.040. Thus, it is found that both "rolling resistance" and "uneven wear" have improved from those in Conventional Example.

Thus, it has been confirmed that "uneven wear" can be improved while preventing the degradation of "rolling resistance" if the spiral rigidity is equal to or smaller than 5%.

The spiral rigidities in Examples 2 to 4 are 0.8% and 1.1% and thus are not larger than 1.5%. Thus, it is found that "uneven wear" improves further than Example 1.

Thus, it is confirmed that "uneven wear" can be further improved if the spiral rigidity is equal to or smaller than 1.5%.

Overview of Third Embodiment

A pneumatic tire according to a third embodiment includes a pair of bead portions, a carcass layer laid between the pair of bead portions, a tread portion positioned on an outer side of the carcass layer in the tire radial direction, and at least two belt layers positioned between the carcass layer and the tread portion. The at least two belt layers form an overlapping area where the belt layers overlap one another.

In a tread width direction cross section under a standard internal pressure and no load condition, a point B is an outermost point in the overlapping area in the tread width direction, a straight line CC is a straight line passing through an outermost point C' of the carcass layer in the tread width direction and extending along the tread width direction, a point C is a point of a tire surface through which the straight line CC passes, a line segment BW is a line segment extending in the tread width direction from an equator center line to the point B, a line segment CW is a line segment extending in the tread width direction from the equator center line to the point C, a line segment BC is a line segment connecting between the point B and the point C, a line segment BC is a line segment connecting between the point B and the point C, a point D is an outermost point of the overlapping area in the tire radial direction, the point B is an innermost point in the overlapping area in the tire radial direction, and a radial direction difference BD is a radial direction difference between the point B and the point D in the tire radial direction. The ratio BW/CW between the length of the line segment BW and the length of the line segment CW is equal to or larger than 0.6 and equal to or smaller than 0.8. The angle θ formed by the line segment BC and the line segment CW is equal to or larger than 50° and equal to or smaller than 70°. The ratio BD/BW of the length of the radial direction difference BD and the length of the line segment BW in the tread width direction cross section under an extremely low internal pressure and no load condition is equal to or larger than 0.05 and equal to or smaller than 0.10.

In the third embodiment, the angle θ formed by the line segment BC and the line segment CW is equal to or larger than 50° and equal to or smaller than 70°, and the ratio BW/CW is equal to or larger than 0.6 and equal to or smaller than 0.8. Thus, as in the first embodiment, both prevention of damage on the sidewall portion and reduction of the rolling resistance can be achieved.

In the third embodiment, the ratio BD/BW is equal to or larger than 0.05 and equal to or smaller than 0.10. With the ratio BD/BW being equal to or larger than 0.05, when the internal pressure is increased, e.g., up to standard internal pressure, the pressure (contact pressure) of the contact between the end portion of the tread contact surface in the tread width direction and the road surface is not too high. Thus, degradation of the uneven wear characteristics due to the increase of the width of the tread contact surface (increase in the contact pressure) is prevented. Meanwhile, with the ratio BD/BW being equal to or smaller than 0.10, when the internal pressure is increased, e.g., up to the standard internal pressure, the difference (hereinafter, circumferential length difference) in the size in the tire radial direction between the center portion the end portion of the tread contact surface in the tread width direction is not too large. Thus, the first belt 40a and the second belt 40b are prevented from deforming at the end portion of the overlapping area O (of the first belt 40a and the second belt 40b) in the tread width direction. Thus, the degradation of the rolling resistance is prevented.

"Uneven wear" is a wear ratio between the center portion of the tread contact surface in the tread width direction and the end portion of the tread contact surface in the tread width direction.

It is to be noted that "extremely low internal pressure" indicates an internal pressure about 30 kPa.

Detail of Third Embodiment

The third embodiment is described below in detail. Hereinafter, differences from the first embodiment are mainly described.

(Configuration of Pneumatic Tire)

Figure 6:
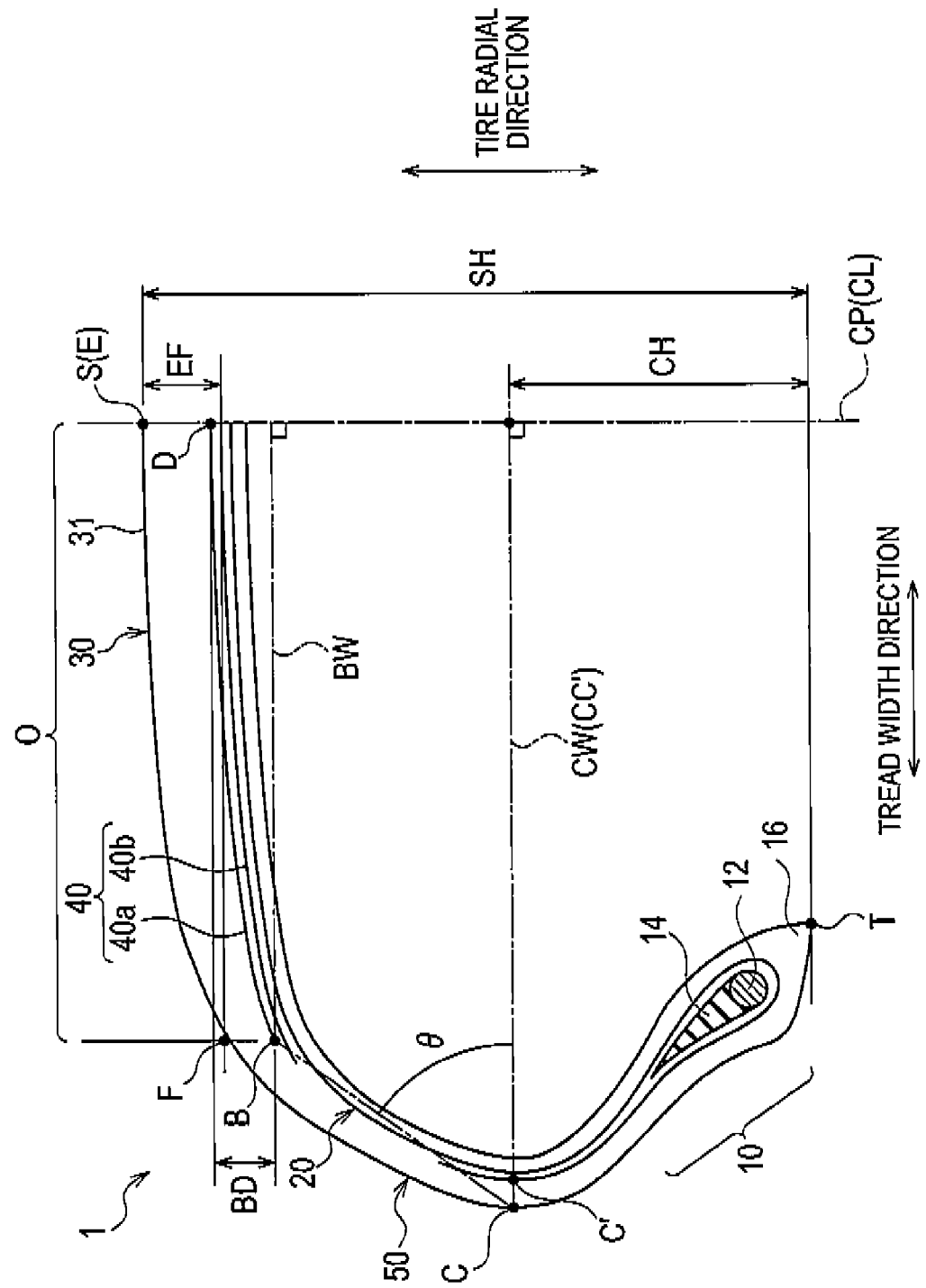
FIG. 6 is a tread-width-direction cross-sectional view of a pneumatic tire 1 according to a third embodiment.

A configuration of the pneumatic tire according to the third embodiment is described below with reference to the drawing. FIG. 6 is a tread-width-direction cross-sectional view of a pneumatic tire 1 according to the third embodiment.

As shown in FIG. 6, the pneumatic tire 1 includes bead portions 10, a carcass layer 20, a tread portion 30, a belt layer 40, and sidewall portions 50, as in the first embodiment. The configuration of the pneumatic tire 1 is same as that in the first embodiment and thus the description thereof omitted.

(External Shape of Pneumatic Tire)

An external shape of the pneumatic tire according to the third embodiment is described with reference to FIG. 6.

As shown in FIG. 6, terms in the tread width direction cross section are defined as follows.

Point D: an outermost point of the overlapping area O in the tire radial direction Point E: an outermost point of the tire surface in the tire radial direction (the point E is the same point as the point S)

Point F: a point of the tire surface at which the straight line extending in the tire radial direction from the point B crosses the tire surface Radial direction difference BD: a radial direction difference between the point B and the point D in the tire radial direction Radial direction difference EF: a radial direction difference between the point E and the point F Contact width GH: a tread contact width in the tread width direction cross section under an internal pressure obtained by subtracting 20 kPa from the maximum internal pressure, and load that is 80% of the maximum load determined in accordance with the internal pressure (in other words, the width of the tread contact surface 31 in the tread width direction)

It is to be noted that the point B is an innermost point of the overlapping area O in the tire radial direction.

The other terms are the same as the counterparts in the first embodiment and thus the description thereof is omitted.

A ratio BD/BW between the length of the radial direction difference BD and the length of the line segment BW in the tread width direction cross section under the extremely low internal pressure and no load condition is preferably equal to or larger than 0.05 and equal to or smaller than 0.10.

With the ratio BD/BW being equal to or larger than 0.05, the width of the tread contact surface 31 in the tread width direction is not too large. Thus, degradation of the uneven wear characteristics due to the increase of the width of the tread contact surface 31 is prevented. Meanwhile, with the ratio BD/BW being equal to or smaller than 0.10, the difference (hereinafter, circumferential length difference) in the size in the tire radial direction between the center portion of the tread contact surface 31 in the tread width direction and the end portion of the tread contact surface 31 in the tread width direction is not too large. Thus, the first belt 40a and the second belt 40b are prevented from deforming at the end portion of the overlapping area O (of the first belt 40a and the second belt 40b) in the tread width direction. Thus, the degradation of the rolling resistance is prevented.

The ratio EF/BW between the length of the radial direction difference EF and the length of the line segment BW is preferably equal to or larger than 0.05 and equal to or smaller than 0.10.

With the ratio EF/BW being equal to or larger than 0.05, the width of the tread contact surface 31 in the tread width direction is not too large. Thus, degradation of the uneven wear characteristics due to the increase of the width of the tread contact surface 31 is prevented. Meanwhile, with the ratio EF/BW being equal to or smaller than 0.10, the difference (hereinafter, circumferential length difference) in the size in the tire radial direction between the center portion of the tread contact surface 31 in the tread width direction and the end portion of the tread contact surface 31 in the tread width direction is not too large. Thus, the first belt 40a and the second belt 40b are prevented from deforming at the end portion of the overlapping area O (of the first belt 40a and the second belt 40b) in the tread width direction. Thus, the degradation of the rolling resistance is prevented.

The ratio EF/BW is preferably the same as the ratio BD/BW. With the ratio EF/BW being the same as the ratio BD/BW, the tread portion 30 has a uniform gage thickness. Thus, uneven wear between the center portion of the tread contact surface 31 in the tread width direction and the end portion of the tread contact surface 31 in the tread width direction is prevented. As a matter of course, the "same" includes a tolerance.

The ratio GH/BW between the length of the contact width GH and the length of the line segment BW is preferably equal to or larger than 1.0 and equal to or smaller than 1.3.

With the ratio GW/BW being equal to or larger than 1.0, the end portion of the tread contact surface 31 in the tread width direction can be prevented from bulging in the tire radial direction, and thus uneven wear of the end portion on the tread contact surface in the tread width direction is prevented. With the ratio GH/BW being equal to or smaller than 1.3, the belt layer 40 does not reach the portion (outer side portion in the tread width direction) that largely deforms when the pneumatic tire 1 contacts the road surface. Thus, generation of a large distortion in a portion around the end portion of the belt layer in the tread width direction is prevented. Thus, the degradation of the rolling resistance is prevented.

(Operation and Effect)

In the third embodiment, the angle θ formed by the line segment BC and the line segment CW is equal to or larger than 50° and equal to or smaller than 70°, and the ratio BW/CW is equal to or larger than 0.6 and equal to or smaller than 0.8. Thus, as in the first embodiment, both prevention of damage on the sidewall portion and reduction of the rolling resistance can be achieved.

In the third embodiment, the ratio BD/BW is equal to or larger than 0.05 and equal to or smaller than 0.10. With the ratio BD/BW being equal to or smaller than 0.05, when the internal pressure is increased, e.g., up to standard internal pressure, the pressure (contact pressure) of the contact between the end portion of the tread contact surface 31 in the tread width direction and the road surface is not too high.

Thus, degradation of the uneven wear characteristics due to the increase in the width of the tread contact surface (increase in the contact pressure) is prevented. Meanwhile, with the ratio BD/BW being equal to or smaller than 0.10, when the internal pressure is increased, e.g., up to the standard internal pressure, the difference (hereinafter, circumferential length difference) in the size in the tire radial direction between the center portion of the tread contact surface 31 in the tread width direction and the end portion of the tread contact surface 31 in the tread width direction is not too large. Thus, the first belt 40a and the second belt 40b are prevented from deforming at the end portion of the overlapping area O (of the first belt 40a and the second belt 40b) in the tread width direction. Thus, the degradation of the rolling resistance is prevented.

[Evaluation Result]

Evaluation results of Examples and Comparative Examples are described below. Table 4 shows evaluation results of Conventional Example, Comparative Examples, and Examples.

TABLE 4

| | BW | CW | BW/CW | BD | EF | BD/BW | EP/BW | GH | GH/BW | Rolling resistance | Uneven wear |
|---|---|---|---|---|---|---|---|---|---|---|---|
| Conventional Example | 165 | 228 | 0.72 | 7 | 7 | 0.042 | 0.042 | 155 | 1.065 | 100 | 2.2 |
| Comparative Example 1 | 165 | 228 | 0.72 | 18 | 18 | 0.109 | 0.109 | 155 | 1.065 | 105 | 2.1 |
| Comparative Example 2 | 165 | 228 | 0.72 | 12 | 12 | 0.073 | 0.073 | 175 | 0.943 | 101 | 2.3 |
| Comparative Example 3 | 178 | 228 | 0.78 | 12 | 12 | 0.067 | 0.067 | 135 | 1.319 | 107 | 0.9 |
| Example 1 | 165 | 228 | 0.72 | 9 | 9 | 0.055 | 0.055 | 155 | 1.065 | 98 | 1.4 |
| Example 2 | 165 | 228 | 0.72 | 12 | 12 | 0.073 | 0.073 | 155 | 1.065 | 97 | 1 |
| Example 3 | 165 | 228 | 0.72 | 14 | 14 | 0.085 | 0.085 | 155 | 1.065 | 98 | 1.2 |
| Example 4 | 165 | 228 | 0.72 | 16 | 16 | 0.097 | 0.097 | 155 | 1.065 | 100 | 1.5 |
| Example 5 | 165 | 228 | 0.72 | 12 | 12 | 0.073 | 0.073 | 165 | 1.000 | 99 | 1.5 |
| Example 6 | 165 | 228 | 0.72 | 12 | 12 | 0.073 | 0.073 | 145 | 1.138 | 97 | 1 |
| Example 7 | 165 | 228 | 0.72 | 12 | 12 | 0.073 | 0.073 | 135 | 1.222 | 96 | 0.95 |

(Common Condition)

Size of pneumatic tire=225/45R17
Internal pressure of pneumatic tire=230 kPa
Rim width=7.5 J (Standard size defined by JATMA)

Conventional Example

As shown in Table 4, the ratio BD/BW in the pneumatic tire of Conventional Example is 0.042 and thus is not within the range from 0.05 to 0.10.

Comparative Example

As shown in Table 4, the ratio BD/BW in the pneumatic tire of Comparative Example 1 is 0.109 and thus is not within the range from 0.05 to 0.10. The ratio GH/BW in the pneumatic tire of Comparative Example 2 is 0.943 and thus is not within the range from 1.0 to 1.3. The ratio GH/BW of the pneumatic tire of Comparative Example 3 is 1.319 and thus is not within the range from 1.0 to 1.3.

Example

As shown in Table 4, the ratios BD/BW in the pneumatic tires of Examples 1 to 7 are 0.055 to 0.097, and thus are within the range from 0.05 to 0.10. The ratios GH/BW in the pneumatic tires of Examples 1 to 7 are 1.00 to 1.222, and thus are within the range from 1.0 to 1.3

(Evaluation Method)

"Rolling resistance" and "uneven wear" are evaluated with pneumatic tires according to Conventional Example, Examples 1 to 3, and Examples 1 to 7 each mounted to a rim having a rim width of a standard size=7.5 J defined by JATMA.

Firstly, a measurement method for "rolling resistance" is described. A rolling resistance of a shaft forming a rotational shaft of the pneumatic tire is obtained by using a drum tester having a steel plate surface and a diameter of 1.7 m. Specifically, the rolling resistance of the shaft is obtained with the each pneumatic tire pressed against the steel plate surface of the drum under the condition of 80 Km/H.

With "rolling resistance" of the pneumatic tire according to Conventional Example being "100", "rolling resistances" of other pneumatic tires are shown as indexes. A smaller value of "rolling resistance" indicates a smaller rolling resistance. It is regarded that there is a significant improvement when the value of "rolling resistance" is reduced by 5%. It is regarded to be very effective when the value of "rolling resistance" is reduced by 10%.

Secondly, a measuring method for "uneven wear" is described. With the drum tester having the steel plates surface and the diameter of 1.7 m, a wear ratio between the center portion of the tread contact surface in the tread width direction and the end portion of the tread contact surface in the tread width direction was obtained. Specifically, a ten minutes test under a condition where no acceleration is applied in a braking direction (free rolling condition) and a ten minutes test under a condition where an acceleration of 0.1 G is applied in the braking direction were alternately performed. A running distance was 5000 km. The wear was obtained from a difference in a depth of a groove on the tread contact surface between before and after the test.

"Uneven wear" is a wear ratio. "1" indicates that the center portion and the end portion of the tread contact surface are evenly worn. A value smaller than "1" indicates that the center portion of the tread contact surface is more worn than the end portion of the tread contact surface. A value larger than "1" indicates that the end portion of the tread contact surface is more worn than the center portion of the tread contact surface.

It is considered that the uneven wear characteristic is bad when the value of "uneven wear" is equal to or smaller than 0.5 or equal to or larger than 2.0.

Thirdly, a measuring method for "contact width" is described. Under a condition where an internal pressure is that obtained by subtracting 20 kPa from the maximum internal pressure, and the load is 80% of the maximum load determined in accordance with the internal pressure, ink is applied on the tread and the pneumatic tire is pressed against cardboard. The width of the ink attached on the cardboard is obtained as "contact width".

(Evaluation Result)

As shown in Table 4, the ratios BD/BW in Examples 1 to 7 are within the range from 0.05 to 0.10. Thus, the tread contact surface is prevented from increasing in the tread width direction. Thus, the difference in the circumference difference between the center portion and the end portion of the tread contact surface is prevented from increasing. Thus, it is found that "uneven wear" is reduced from those in Conventional Example and Comparative Example 1.

Other Embodiment

As described above, the details of the present invention have been disclosed by using the embodiments of the present invention. However, it should not be understood that the description and drawings which constitute part of this disclosure limit the present invention. From this disclosure, various alternative embodiments, examples, and operation techniques will be easily found by those skilled in the art.

In the embodiment, the pneumatic tire 1 including the belt layers of two layers is exemplified. However, the embodiment is not limited to this. For example, the pneumatic tire 1 may include three belt layers. In such a case, the overlapping area O is an area where at least two belt layers overlap in the tire radial direction. Thus, when the belts have different lengths in the tread width direction and are each symmetrical with respect a tire equator plane, the point B is an end portion of the second longest belt in the tread width direction.

In the embodiment, the pneumatic tire 1 having a symmetrical shape with respect to the equator center plane CP is exemplified. However, the embodiment is not limited to this. For example, the pneumatic tire 1 may have an asymmetrical shape with respect to the equator center plane CP.

In the second embodiment, the pneumatic tire including one layer of the spiral belt layer 40c is exemplified. However, the embodiment is not limited to this. For example, the pneumatic tire 1 may include one layer of the spiral belt layer 40c in the center portion in the tread width direction and may include two layers of the spiral belt layer 40c at both end portions in the tread width direction.

In the first embodiment, the case is exemplified where the pneumatic tire 1 is under the standard internal pressure. However, the parameters except for the radial direction difference BD are unchanged even when the internal pressure is increased. Thus, in the first embodiment, the values of the parameters may be values of the pneumatic tire 1 under the extremely low internal pressure.

In the second and the third embodiment, the cases are exemplified where the pneumatic tires are under the extremely low internal pressure. The radial direction difference BD largely decreases by increasing the internal pressure. Thus, in the second embodiment and the third embodiment, values of the ratio BD/BW when the pneumatic tire 1 is under extremely low internal pressure are shown.

Entire contents of Japanese Patent Application No. 2010-088618 (filed on Apr. 7, 2010), Japanese Patent Application No. 2011-056699 (filed on Mar. 15, 2011), and Japanese Patent Application No. 2011-056700 (filed on Mar. 15, 2011) are incorporated herein by reference.

INDUSTRIAL APPLICABILITY

The present invention can provide a pneumatic tire of which a rolling resistance can be reduced while a sidewall portion is prevented from being damaged.

The invention claimed is:

1. A pneumatic tire comprising:
a pair of bead portions each including a bead toe that is an inner end portion of the bead portion in the tire radial direction, a bead core, and a bead filler adjoining the bead core, the bead filler enhancing a rigidity of the bead portion,
a carcass layer laid between the pair of bead portions, the carcass layer being bent outward in the tread width direction so as to cover the bead core and the bead filler;
a tread portion positioned on an outer side of the carcass layer in a tire radial direction; and
at least two belt layers positioned between the carcass layer and the tread portion, wherein
the at least two belt layers form an overlapping area where two of the at least two belt layers overlap one another, in a tread width direction cross section mounted to a standard rim under a standard internal pressure and no load condition, a point B is an outermost point of the overlapping area in a tread width direction, a straight line CC is a straight line passing through an outermost point C' of the carcass layer in the tread width direction and extending along the tread width direction, a point C is a point of a tire surface through which the straight line CC passes, a line segment BW is a line segment extending in the tread width direction from an equator center line to the point B, a line segment CW is a line segment extending along the tread width direction from the equator center line to the point C, and a line segment BC is a line segment connecting between the point B and the point C, a point U is an outermost point of the bead filler in the tire radial direction, a point T is an innermost point of the bead toe in the tire radial direction, a point S is a point of the tire surface through which the equator line passes, a point D is an outermost point of the overlapping area in the tire radial direction, a point E is an outermost point of the tire surface in the tire radial direction, a point F is a point of the tire surface at which a straight line extending in the tire radial direction from the point B crosses the tire surface, a ratio BW/CW between a length of the line segment BW and a length of the line segment CW is equal to or larger than 0.6 and equal to or smaller than 0.8, and an angle θ formed by the line segment BC and the line segment CW is equal to or larger than 50° and equal to or smaller than 70°;

a radial direction difference CH is a radial direction difference between the point C and the point T, a radial direction difference SH is a radial direction difference between the point S and the point T, and the ratio CH/SH is equal to or smaller than 0.50;

a radial direction difference BD is a radial direction difference between the point B and the point D in the tire radial direction, and the ratio BD/BW is equal to or larger than 0.02 and equal to or smaller than 0.1;

a radial direction difference EF is a radial direction difference between the point E and the point F in the tire radial direction, and the ratio EF/BW is equal to or larger than 0.05 and equal to or smaller than 0.15;

a radial direction difference UH is a radial direction difference between the point U and the point T, and the radial direction difference UH is equal to or smaller than 25 mm.

2. The pneumatic tire according to claim 1, wherein in the tread width direction cross section mounted to a standard rim including a rim flange under a standard internal pressure and no load condition, a point V is an outermost point of the rim flange in the tire radial direction, a straight line VV' is a straight line passing through the point V and extending along the tread width direction, and a point W is a point of the carcass layer provided on the straight line VV', and is the outermost point that defines the center of the carcass layer in the tread width direction, and a shortest distance between the tire surface and the point W is equal to or smaller than 2.8 mm.

3. The pneumatic tire according to claim 1, wherein the ratio BD/BW is equal to or larger than 0.05 and equal to or smaller than 0.08.

4. The pneumatic tire according to claim 1, wherein the ratio EF/BW is equal to or larger than 0.08 and equal to or smaller than 0.13.

5. The pneumatic tire according to claim 1, wherein in the tread width direction cross section mounted to a standard rim under a standard internal pressure and no load condition, a point G is an outermost point of the at least two belt layers in the tread width direction, and a shift width BG is a shift width between the point B and the point G in the tread width direction, and the shift width BG is equal to or larger than 1 mm and equal to or smaller than 15 mm.

6. The pneumatic tire according to claim 1, wherein only the bead filler and the bead core are covered by the carcass layer.

7. A pneumatic tire comprising:

a pair of bead portions each including a bead toe that is an inner end portion of the bead portion in the tire radial direction, a bead core, and a bead filler adjoining the bead core, the bead filler enhancing a rigidity of the bead portion, a carcass layer laid between the pair of bead portions, the carcass layer being bent outward in the tread width direction so as to cover the bead core and the bead filler;

a tread portion positioned on an outer side of the carcass layer in a tire radial direction; and at least two belt layers positioned between the carcass layer and the tread portion, wherein the at least two belt layers form an overlapping area where two of the at least two belt layers overlap one another, in a tread width direction cross section mounted to a standard rim including a rim flange under a standard internal pressure and no load condition, a point B is an outermost point of the overlapping area in a tread width direction, a straight line CC is a straight line passing through an outermost point C' of the carcass layer in the tread width direction and extending along the tread width direction, a point C is a point of a tire surface through which the straight line CC passes, a line segment BW is a line segment extending in the tread width direction from an equator center line to the point B, a line segment CW is a line segment extending along the tread width direction from the equator center line to the point C, and a line segment BC is a line segment connecting between the point B and the point C, a point U is an outermost point of the bead filler in the tire radial direction, a point T is an innermost point of the bead toe in the tire radial direction, a point V is an outermost point of the rim flange in the tire radial direction, a point D is an outermost point of the overlapping area in the tire radial direction, a point E is an outermost point of the tire surface in the tire radial direction, a point F is a point of the tire surface at which a straight line extending in the tire radial direction from the point B crosses the tire surface, a ratio BW/CW between a length of the line segment BW and a length of the line segment CW is equal to or larger than 0.6 and equal to or smaller than 0.8, and an angle θ formed by the line segment BC and the line segment CW is equal to or larger than 50° and equal to or smaller than 70°;

a radial direction difference BD is a radial direction difference between the point B and the point D in the tire radial direction, and the ratio BD/BW is equal to or larger than 0.02 and equal to or smaller than 0.1;

a radial direction difference EF is a radial direction difference between the point E and the point F in the tire radial direction, and the ratio EF/BW is equal to or larger than 0.05 and equal to or smaller than 0.15;

a radial direction difference UH is a radial direction difference between the point U and the point T, and the radial direction difference UH is equal to or smaller than 25 mm; and a straight line VV' is a straight line passing through the point V and extending along the tread width direction, a point W is a point of the carcass layer provided on the straight line VV', and is the outermost point that defines the center of the carcass layer in the tread width direction, and a shortest distance between the tire surface and the point W is equal to or smaller than 2.8 mm.

\* \* \* \* \*